June 28, 1966     M. M. ZENNIE     3,257,753

LIQUID SPREADER DEVICES

Filed July 27, 1964     3 Sheets-Sheet 1

INVENTOR
MICHAEL MAURICE ZENNIE
BY
George A. Schwenger
ATTORNEY

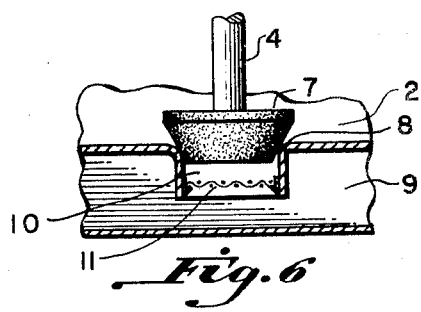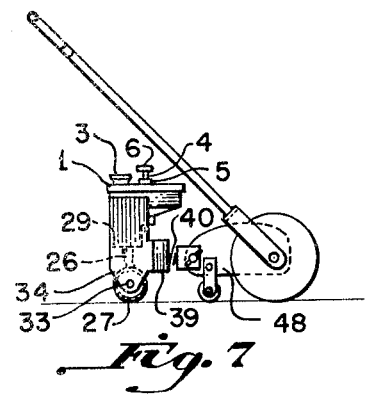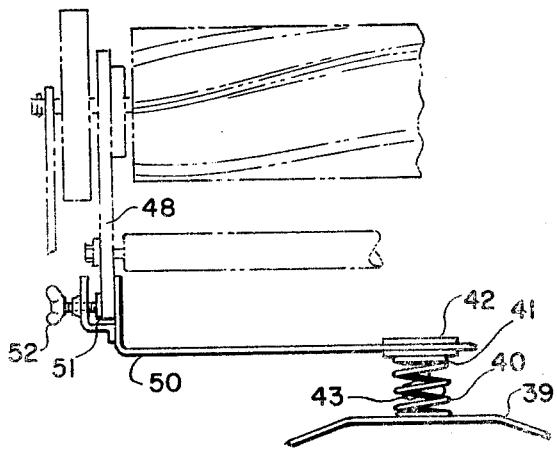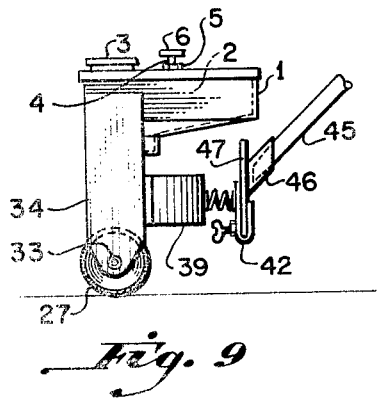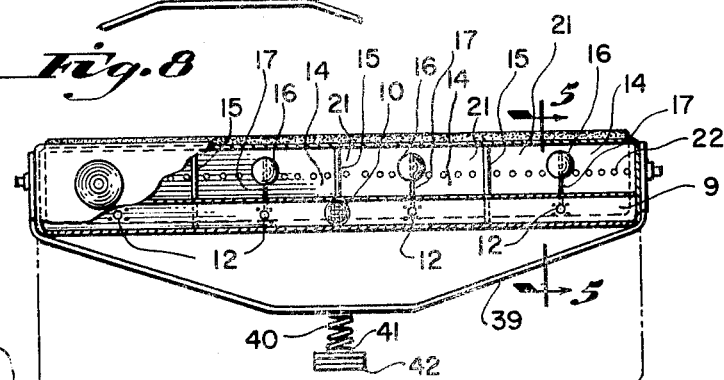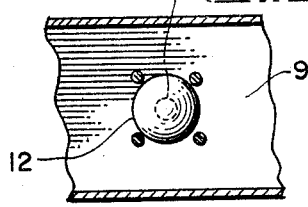

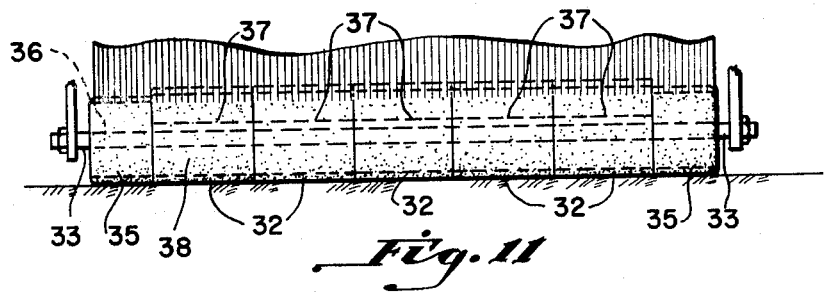
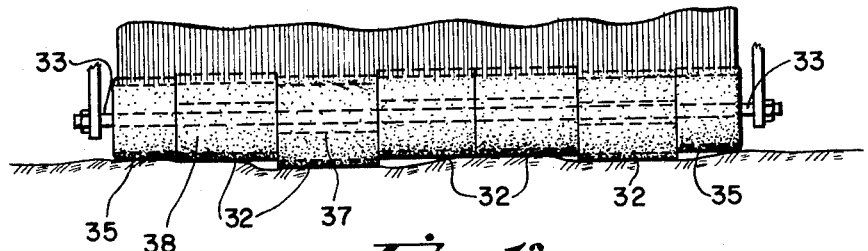
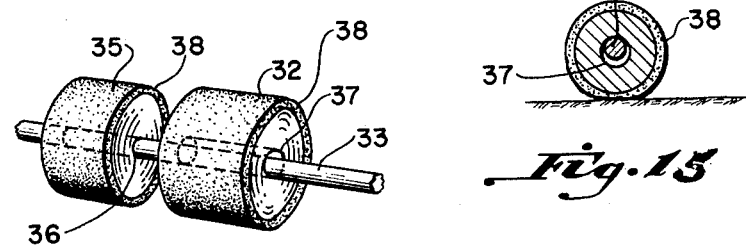 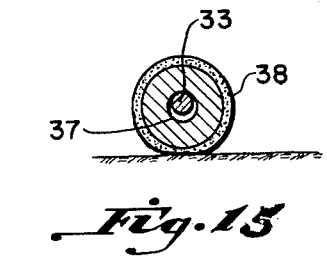
INVENTOR
MICHAEL MAURICE ZENNIE
BY
George A. Schwenzer
ATTORNEY ized Patent Office
3,257,753
Patented June 28, 1966

1

3,257,753
LIQUID SPREADER DEVICES
Michael Maurice Zennie, 1274 Morten Ave.,
Cincinnati, Ohio
Filed July 27, 1964, Ser. No. 385,300
13 Claims. (Cl. 47—1.5)

My invention relates to that type of devices used to spread liquid weed killers, insecticides and fertilizers for lawns. It is of the type that may be attached to a lawn mower to spread the liquid simultaneously while mowing the lawn or it can be utilized separately from a lawn mower to spread the liquid.

It is an object of my invention to provide a liquid spreader that is detachable and rotatably secured to a lawn mower whereby the liquid is spread uniformly over a mowed area of lawn simultaneously while mowing the lawn.

Another object of my invention is to provide a liquid spreader that will insure a uniform deposit of the liquid over an area of lawn simultaneously while mowing the lawn even though the spreader be at an angle to the path of the mower.

A further object is to provide a liquid spreader having a contact rotary spreader which automatically adjusts itself to the contour of the lawn while applying the liquid to the lawn to insure equal distribution of the liquid on the area of lawn being treated with the liquid.

Another object is to provide a liquid spreader that can be operated independently of a lawn mower to spread liquids uniformly over an area of lawn to treat the lawn with weed killer, insecticide and/or fertilizer.

Generally it is an object of my invention to provide a spreader for liquid weed killer, insecticide and/or fertilizer that is a complete unit operable independently or in combination with a lawn mower while mowing a lawn. The spreader contains a rotary distributing element that automatically adjusts itself to the contour of the lawn thereby insuring a uniform application to the area being treated with the liquid.

The means by which the foregoing and other objects of my invention are accomplished will readily be understood from the ensuing specifications upon reference to the drawings forming part of this application in which the same indicia indicate similar parts.

In the drawings:

FIGURE 6 is a fragmentary section in elevation of a valve control between a reservoir and ball valve chambers.

FIGURE 7 is a side elevation showing my spreader attached to a reel type lawn mower.

FIGURE 8 is a plan view showing part of a reel type lawn mower together with brackets to attach my spreader to the mower.

FIGURE 9 is a side elevation of my spreader detached from a mower and attached to a handle to operate it independently and separately from a mower.

FIGURE 10 is a plan view with part of my spreader in section taken on line 10—10 of FIGURE 3.

FIGURE 11 is a view in elevation of my segmented spreader roll.

2

Figure 1:
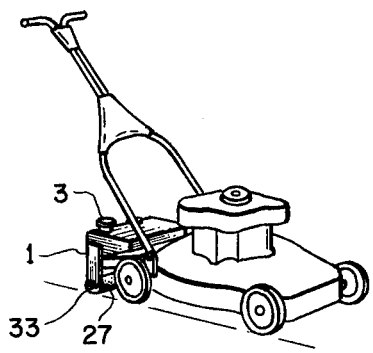
FIGURE 1 is a perspective view of a rotary type lawn mower with my spreader removably attached.
Figure 2:
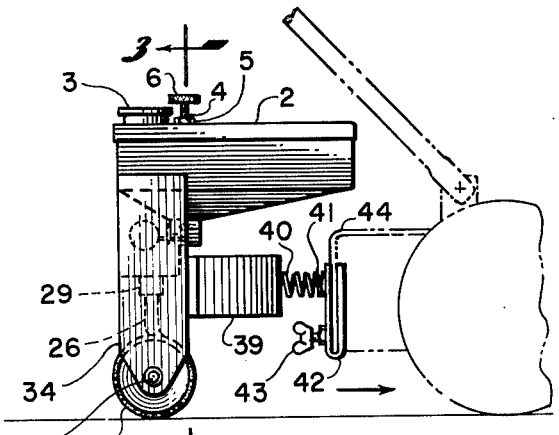
FIGURE 2 is a side elevation of my spreader removably attached to a rotary type mower.

FIGURE 12 is a view in elevation showing how my segmented roller automatically adjusts to the contour of the lawn.

FIGURE 13 is a perspective of two segments of spreader roll and shaft indicating an enlarged hole in relation to the shaft for intermediate section of the roll.

FIGURE 14 is a plan view of a ball valve and cage means for keeping the ball in proper position.

FIGURE 15 is a side elevation of a segment of the roller in contact with the ground showing how a cushion on its perimeter flattens to spread liquid.

Referring to FIGURES 1, 2, 7, 9 and 10 there is illustrated a tank housing 1 for a liquid reservoir 2 having a removable cap 3 for a filling hole in its top. A threaded valve stem 4 is threaded for rotatably mounting in a bonnet 5 that is secured to the top of the tank. Secured to the valve stem there is a handle 6 to rotate a tapered valve 7 to and from its valve seat 8 at the top of an opening 10 through which the liquid from the reservoir is admitted into a longitudinal encased channel 9. At the bottom of the opening 10 there is a mesh 11 that acts as a strainer to prevent non-soluble foreign matter from flowing from the reservoir into the longitudinal channel. Spaced within the longitudinal channel there are a multiple of ball valves 12 that close ports 13 which allows the liquid to flow from the longitudinal channel into a multiple of separated compartments 14 having solid partition walls 15 to keep the liquid from flowing across and into communication between the compartments thereby confining the liquid in a certain compartment when the spreader is tilted because of the slope of the ground. The valves also prevent excess pressure from the bulk of liquid in the tank into the compartments 14. The level of the liquid in each of the compartments is separately controlled by hollow floats 16 secured to rocking levers 17 that are pivotally mounted in brackets 18 fixed on the housing of the longitudinal channel 9. An end 19 of the levers 17 has a hooked end 20 that extends through the ports 13 and this hooked end lifts the ball valves 12 when the level of the liquid in any compartment permits its ball float to drop down. When the liquid reaches a determined level in a compartment the float will rise and the contact between the hooked end and ball valve will be broken thereby allowing the ball valve to close the ports and stop the liquid from flowing from the longitudinal channel into the respective compartments. In each of the compartments there are bowed plates 21 that have a line of seepage holes 22 which allows the liquid to pass from the compartments and saturate layers of sheet fabric 23 such as nylon that is superimposed on top of cotton fibre pads 24. The bowed plates are held securely down on the fabric by angular hooked rails 25. The liquid is evenly distributed and uniformly saturates the fabric and pads. A bristle brush 26 extends across the width of a spreader roller 27. While I have illustrated a brush any flexible absorbent wiper can be used. A head 28 of the brush is fixed in a bottom 29 of the housing. A multiple of holes 30 through the head of the brush allows the liquid to seep from the cotton fibre pads to the bristles of the brush and the liquid is thereby uniformly deposited on the spreader roller that during rotation deposits the liquid onto the lawn.

Each of the compartments 14 have vent holes 31 to prevent air locking of the liquid and allow it to seep uniformly and gradually from and into the compartments 14. These vents will also act as an indicator if a ball valve for a particular compartment is not functioning in that the compartment when flooded will cause liquid to flow out of the vent.

Figure 3:
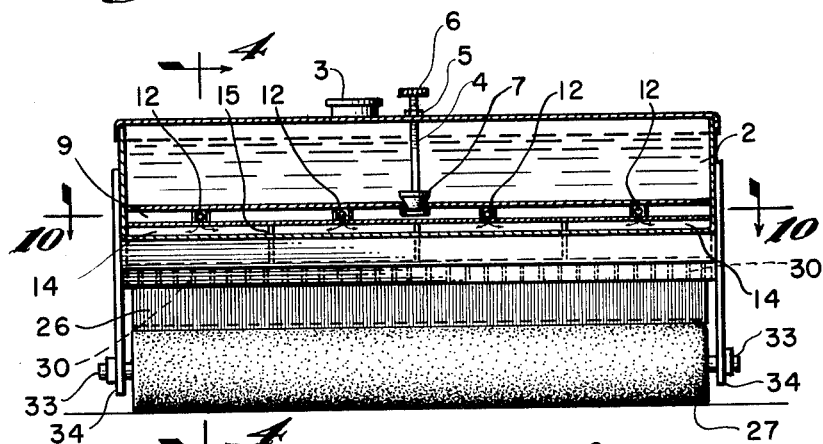
FIGURE 3 is a longitudinal section in elevation through my spreader taken on line 3—3 of FIGURE 2.
Figure 4:
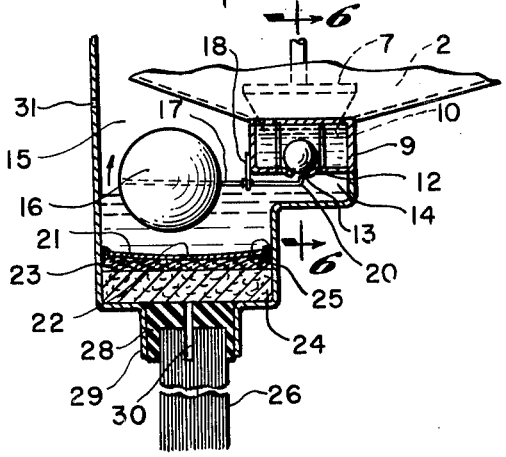
FIGURE 4 is an end elevation partially in section through my spreader taken on line 4—4 of FIGURE 3.
Figure 5:
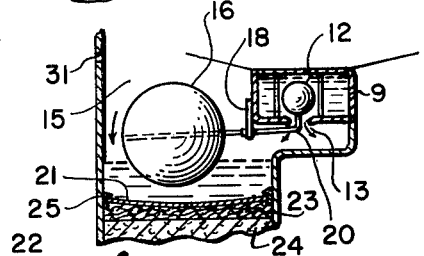
FIGURE 5 is a fragmentary section in elevation showing a ball valve and float control taken on line 5—5 of FIGURE 10.

While I have illustrated in FIGURES 11 and 12 a preferred segmented roller it is not intended to limit myself to this type since in practice it was found that a solid roller as illustrated in FIGURE 3 works satisfactorily. The preferred type of roller is divided into separated segments 32 rotatable independently each to the other on a shaft 33 that is fixed in bearing brackets 34 that are fixedly secured on the housing. In addition to the segments there are end rollers 35 which are smaller in diameter than the segments 32. These end rollers 35 have bores 36 to allow them to have a rolling fit on the shaft 33 while the segments have enlarged bores 37 in relation to the shaft 33 to allow them to raise up and down in relation to the shaft and end rollers. The difference in the diameters of the rollers and the bores in relation to the shaft provides an automatic flexible means to allow the roller to adjust itself to the variations of the contoured surface of the lawn being treated as illustrated in FIGURE 12. Outer perimeters of the rollers have a padded compressible surface of sponge rubber 38 and the like. Upon contact with the lawn the padded surface will develop a rolling flat contact as illustrated in FIGURE 15 thereby insuring positive deposit of liquid on the lawn.

Secured to the housing there is a bracket 39 having a resilient coiled spring 40 secured to it which provides a flexible connection between the spreader and lawn mower to allow the spreader to tilt relative to the mower when the contour of lawn under the mower is different than the contour of the lawn under the spreader roller. The spring is of sufficient flexible rigidity to keep the spreader in working relation to the mower. This insures that the roller will always remain in contact with the lawn being treated even through the mower is at an angle to the spreader. On an opposite end 41 secured to the spring there is a U-shaped socket 42 which has a rotatable wing bolt 43 to detachably clamp the spreader on a rear frame 44 of a rotary mower as shown in FIGURE 2.

In FIGURE 9 there is illustrated a handle 45 secured in a boss 46 that is fixed on a plate 47 adapted to be removably secured in the U bracket. With this arrangement my spreader can be used independently and separately of a mower.

Referring to FIGURES 7 and 8 there is illustrated how my spreader is attached to the reel type mower. Secured to the usual roller brackets 48 of a reel type mower 49 is a detachable span bar 50 reaching across the rear of the mower and having sockets 51 at each end. In the sockets there are wing clamp bolts 52 to secure the spanner bar to the mower brackets 48. After the spanner bar 50 is secured on the mower it is secured in the U socket 42 by means of the wing bolt 43 thereby connecting the spreader to the reel type mower.

After attaching my spreader to a mower to operate it to spread liquid weed killer, insecticide or fertilizer simultaneously while mowing a lawn the liquid is poured into the reservoir. If desired the valve 7 may be left open when initially filling the reservoir with the liquid to allow the compartments to fill up and cause the floats to close the ball valves. The liquid will flow from the reservoir into the longitudinal channel and then through the ball valves into the various compartments. When the liquid reaches a certain level in the compartments each of the floats will automatically allow the ball valves to close and stop the liquid from flowing. The liquid flows through the holes 22 in bowed plates 21 and saturates the fabric and cotton fibres. From the saturated fibres the liquid will flow through the holes in the head of the brush and the bristles of the brush will be supplied with liquid. The bristles are tangent to the roller slightly below the top of the roller to insure that the roller will be free to roll. As the spreader moves forward the liquid on the roller will be transferred to the lawn uniformly. Since the roller has a resilient compressible cover there will be a rolling flat in contact with the lawn which is further assurance of uniform spreading of the liquid. Since my roller is segmented the roller adjusts itself to any deviations due to depressions or knobs in the lawn contour because a segment passing over a depression will drop down into the depression while a segment passing over a knob will rise resulting from the oversized holes in them. Since the end rollers are smaller in diameter and the segments have enlarged holes the amount of movement up or down by the segments is increased to the extent that the difference in the diameter plus the enlargement of the hole is relative to the radius from the center of the shaft to the uppermost or lowest position of the segments in either position.

Having thus described my invention I claim:

1. A liquid spreading device comprising a tank providing a reservoir for liquids connected to a distributing channel, valve control means for said liquids intermediate said reservoir and distributing channel, a multiple of valves spaced in said channel to control the flow of liquids into a series of compartments adjacent to said channel, float means in said compartments adapted to operate said valves in said distributing channel, means to transmit said liquids from said compartments to a wiper, and a roller to transfer said liquids from said wiper to a surface upon which said liquid is spread.

2. A liquid spreading device as in claim 1, said spreading device adapted to be attached by removable means to a lawn mower to spread said liquid simultaneously while mowing a lawn with said lawn mower.

3. A liquid spreading device as in claim 2, said removable means having a semi-rigid resilient helical spring adapted to allow tilting of said spreader in relation to said mower while spreading said liquid simultaneously during the mowing of the lawn.

4. A liquid spreading device as in claim 1, said valves in said channel comprising solid balls confined from displacement and rod means actuated by said floats according to the level of the liquid in said compartments to raise said balls to permit the flow of liquid from the said channel into said compartments.

5. A liquid spreading device as in claim 1, said means to transfer said liquid from said compartments being laminated pads of woven materials and layers of fibres.

6. A liquid spreading device as in claim 1, said means to transfer said liquid from said compartments being laminated pads of woven materials and layers of fibres and a plate secured atop said laminated pads having holes through which said liquid flows to saturate said laminated pads.

7. A liquid spreading device as in claim 1, said roller having a compressible surface adapted to flatten on contact with said surface upon which said liquid is spread.

8. A liquid spreading device as in claim 1, said roller having a multiple of sections and said sections being rotatable separately each to the other.

9. A liquid spreading device as in claim 1, said roller having a multiple of sections with resilient compressible surface covering and said sections being rotatable separately each to the other, end sections of said roller being smaller in diameter than the sections between the end rollers, said sections between said end sections having enlarged bearing holes to allow said in-between sections to raise and lower themselves in relation to each other.

10. A liquid spreading device as in claim 1, said spreading device having a semi-rigid helical coil spring secured to it and a socket secured to an end of said coil spring to provide a means for detachably securing said spreader to a rotary mower.

11. A liquid spreading device as in claim 1, said spreading device having one end of a flexible rotatable means secured to it and a U-channel secured to another end of said flexible rotatable means said U-channel providing a means for securing said spreader to means to move said spreader over an area to which said liquid is to be applied.

12. A liquid spreading device comprising, a distributing channel, liquid supply means for supplying said liquid to said distributing channel, valve control means for said liquid intermediate said liquid supply means and distributing channel, a multiple of valves spaced in said channel to control the flow of said liquid, a series of compartments adjacent to said channel and communicating therewith, float means in said compartments adapted to operate said valves in said distributing channel, means to transmit said liquid from said compartments and a wiper and a roller to transfer said liquid from said compartments to a surface upon which said liquid is spread.

13. A liquid spreading device comprising, a mixing tank for liquids, a chamber connected to said mixing tank, valve control means for said liquids intermediate of said mixing tank and said chamber, a second valve in said chamber to control the flow of said liquid into a transverse compartment adjacent to said chamber, float means in said compartment adapted to operate said second valve in said chamber, means in said compartment to transmit said liquid from said chamber, and a wiper and a roller to transfer said liquid from said compartment to a surface upon which said liquid is spread.

References Cited by the Examiner
UNITED STATES PATENTS

| 3,021,642 | 2/1962 | Ewing | 47—1.5 |
| 3,152,353 | 10/1964 | Cravener | 15—575 |

ABRAHAM G. STONE, *Primary Examiner.*

R. E. BAGWILL, *Assistant Examiner.*